United States Patent [19]
Ruigrok

[11] Patent Number: 5,258,883
[45] Date of Patent: Nov. 2, 1993

[54] THIN-FILM MAGNETIC HEAD
[75] Inventor: Jacobus J. M. Ruigrok, Eindhoven, Netherlands
[73] Assignee: U.S. Philips Corporation, New York, N.Y.
[21] Appl. No.: 762,813
[22] Filed: Sep. 17, 1991
[30] Foreign Application Priority Data
Jul. 5, 1991 [EP] European Pat. Off. ........ 91201740.7
[51] Int. Cl.⁵ ............................................. G11B 5/127
[52] U.S. Cl. ................................................... 360/113
[58] Field of Search ...................... 360/113; 338/32 R; 324/252

[56] References Cited
U.S. PATENT DOCUMENTS
3,921,217 11/1975 Thompson ........................... 360/113
4,617,600 10/1986 Somers ................................. 360/113

Primary Examiner—Craig E. Church
Attorney, Agent, or Firm—John C. Fox; Norman N. Spain

[57] ABSTRACT

Thin-film magnetic head comprising a substrate (3), a magnetoresistive element (9) and two magnetically conducting flux guides (5, 7) extending substantially parallel to each other for magnetic cooperation with the magnetoresistive element (9). A non-magnetic read gap (13) adjacent to a head face (1) extends between the flux guides. The first flux guide (5) is built up in layers and comprises a first soft-magnetic layer (5A) opposite the second flux guide (7), a second soft-magnetic layer (5B) and an insulation layer (5C) of a non-magnetic material extending substantially parallel to the substrate and situated between these soft-magnetic layers. Said soft-magnetic layers join in a common end portion (5E) proximate to the head face. The first soft-magnetic layer is an interrupted layer having two spatially separated layer portions (5AA, 5AB), bridged by the magnetoresistive element.

7 Claims, 1 Drawing Sheet

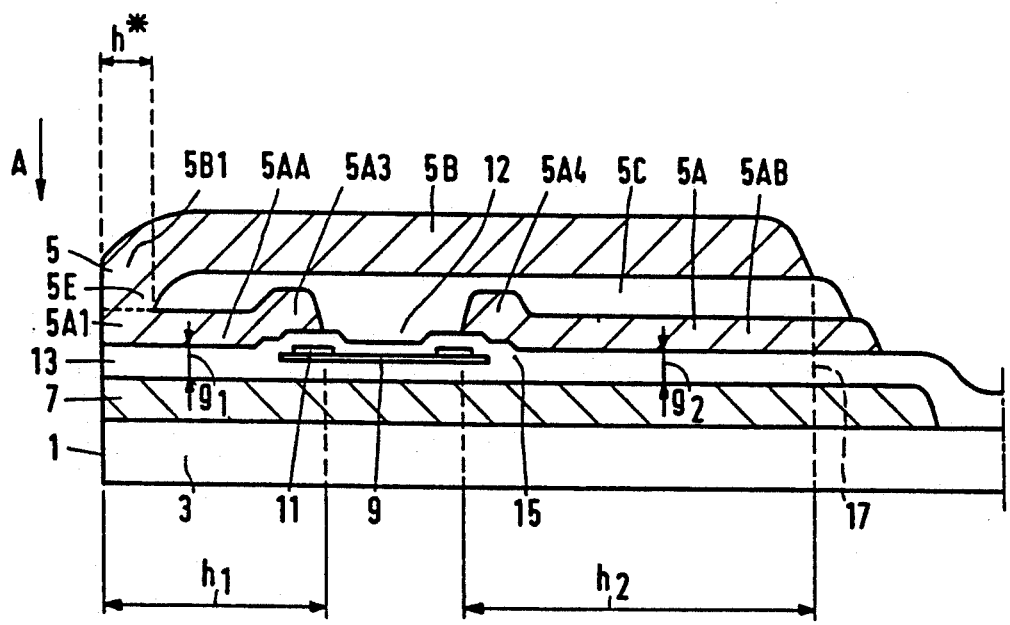

THIN-FILM MAGNETIC HEAD

BACKGROUND OF THE INVENTION

The invention relates to a thin-film magnetic head comprising a substrate, a magnetoresistive element, a first magnetically conducting flux guide having a non-magnetic space bridged by the magnetoresistive element, and a second magnetically conducting flux guide extending substantially parallel to the first flux guide for magnetic cooperation with said element, and a non-magnetic read gap adjacent to a head face extending between the flux guides and the first flux guide.

Patent magnetic head of this type is known from U.S. Pat. No. 4,321,640, herein incorporated by reference. The known magnetic head has a contact face for cooperation with a record carrier, and a magnetic yoke having two parallel limbs terminating in the contact face. A non-magnetic space is recessed in one of these limbs, which space is bridged by a strip of magnetoresistive material. The magnetic yoke, which forms a limb-defined read gap at the contact face, ensures that magnetic flux is collected at and returned to the strip of magnetoresistive material during operation, without this strip itself being in contact with the record carrier.

A drawback of the known magnetic head is that it is not only sensitive to magnetic flux associated with signals having shorter wavelengths, which flux originates from the record carrier part situated opposite the read gap, but is also sensitive to magnetic flux associated with signals having longer wavelengths, which flux is radiated directly into the magnetic yoke from the record carrier or from the exterior. This may easily cause distortion, in particular overdrive, particularly in applications in which a relatively large wavelength range must be read, as in audio applications in which long-wave signals of great strength are present on the record carrier. In other applications, such as in digital applications, the externally supplied signals disturb the signals entering via the read gap.

OBJECTS AND SUMMARY OF THE INVENTION

It is an object of the invention to improve the magnetic head of the type described in the opening paragraph in such a way that direct radiation of magnetic fields is inhibited.

To this end the magnetic head according to the invention is characterized in that the first flux guide is built up in layers and comprises a first soft-magnetic layer opposite the second flux guide, a second soft-magnetic layer and an insulation layer of a non-magnetic material extending substantially parallel to the substrate and being situated between said soft-magnetic layers, which are interconnected in a magnetically conducting manner proximate to the head face, the first soft-magnetic layer being an interrupted layer having two spatially separated layer portions bridged by the magnetoresistive element.

In the magnetic head according to the invention the magnetic material surrounding the magnetoresistive element constitutes an effective shield against direct radiation of magnetic fields. The larger the length, viewed from the head face, of the second soft-magnetic layer of the first flux guide, the better the shield against direct radiation of magnetic fields originating from signals having medium and long wavelengths. Medium wavelengths are understood to mean wavelengths ranging between several microns and ten microns. Long wavelengths are wavelengths of more than ten microns.

The magnetic head according to the invention is particularly suitable for analog and digital applications. For example, single or multi-track audio, video and data read devices are possible applications.

A practical embodiment of the magnetic head according to the invention is characterized in that the insulation layer is spaced apart from the head face, the first flux guide built up in layers having an end portion terminating in the head face and formed exclusively from a soft-magnetic material, the insulation layer being adjacent to said end portion.

A technologically attractive embodiment is characterized in that the magnetoresistive element extends between the second flux guide and the first soft-magnetic layer of the first flux guide.

It has been found that in the magnetic head according to the invention the thickness of the insulation layer between the two soft-magnetic layers of the first flux guide plays an important role in the sensitivity of the magnetic head for signals which reach the magnetoresistive element via the read gap. Very good results, i.e. little loss of sensitivity can be achieved with the embodiment which is characterized in that the insulation layer between the first and the second soft-magnetic layer has a thickness which is at least equal to $4h_2 \cdot g_1/h_1$, in which $h_1$ is the length, viewed from the head face, of the layer portion of the first magnetic layer adjacent to the head face, $h_2$ is the length, viewed from the head face, of the second magnetic layer from the end of the magnetoresistive element furthest from the head face and in which $g_1$ and $g_2$ are the distances between the second flux guide and the layer portion of the first flux guide adjacent to the head face and between the second flux guide and the other layer portion of the first flux guide, respectively.

It is to be noted that U.S. Pat. No. 4,617,600, herein incorporated by reference, describes a magnetic head for reading analog information from a recording medium, which head has a magnetoresistive element which is present in a three-limb magnetic yoke. Each of the three limbs of the magnetic yoke has a pole face directed towards the recording medium to be scanned, the pole face of one of the outer limbs being further remote from the recording medium than the coplanar pole faces of the central limb and the other outer limb. The central limb is interrupted and has a space which is bridged by the magnetoresistive element. It has been found that in many applications the construction of this magnetic head provides insufficient shielding against unwanted radiation of magnetic fields on the magnetoresistive element.

BRIEF DESCRIPTION OF THE DRAWING

The invention will be described in greater detail by way of example with reference to the accompanying drawing in which the FIGURE is a diagrammatic cross-section of an embodiment of the magnetic head according to the invention.

DESCRIPTION OF THE PREFERRED EMBODIMENT

The thin-film magnetic head according to the invention shown in the FIGURE has a head face or contact face 1 for cooperation with a magnetic recording medium such as a magnetic tape which is movable with respect to the magnetic head in the direction of the arrow A shown. The magnetic head comprises a non-magnetic substrate 3 of, for example a ceramic material such as Al$_2$O$_3$/TiC on which a first flux guide 5 and a second flux guide 7 are present. The flux guides are formed from a soft-magnetic material such as NiFe, AlFeSi or an amorphous alloy. If the substrate 3 is formed from a soft-magnetic material, the substrate itself may function as the second flux guide.

For forming a read portion an electrically conducting magnetoresistive element 9 is present between the first flux guide 5 and the second flux guide 7. The element 9 may have a barber pole structure 11 as described in U.S. Pat. No. 4,052,748 (herein incorporated by reference). The magnetic head may also have a bias winding for generating a magnetic field for premagnetizing the magnetoresistive element 9.

The first and the second flux guides 5 and 7 define a read gap 13 at the head face 1, which gap accommodates a non-magnetic material such as an oxide.

The first flux guide 5 is built up layer by layer and comprises a first soft-magnetic layer 5A, a second soft-magnetic layer 5B and an insulation layer 5C of a non-magnetic material such as an oxide or a photoresist extending between the two layers 5A and 5B. Both soft-magnetic or magnetically conducting layers 5A and 5B have end portions 5A1 and 5B1 adjacent to the head face 1 which are interconnected to form an end portion 5E,. The insulation layer 5C is spaced apart from the head face 1 and adjoins the interconnected end portions 5A1 and 5B1.

Opposite the magnetoresistive element 9 the first flux guide 5 is interrupted to form a non-magnetic space or gap 12 which is bounded by two flux guide portions 5A3 and 5A4 partly overlapping the magnetically sensitive transducing element 9.

The magnetic head according to the invention may be made by means of known thin-film techniques using processes such as sputtering, vapour deposition and/or etching. Conducting layers for forming the flux guide 7, the magnetoresistive element 9 and the flux guide 5 are successively provided on the substrate, the insulation layer 5C being provided between the soft-magnetic layers 5A and 5B. Said conducting layers are separated by insulation layers of a magnetically and electrically insulating material such as an oxide, for example, SiO$_2$ or Al$_2$O$_3$, a synthetic resin or a photoresist. The joint insulation layers are denoted by the reference numeral 15.

The insulation layer 5C has a thickness t which is at least equal to $4h_2 \cdot g_1/h_1$. The term $h_1$ is the length of the layer portion 5AA of the layer 5A adjacent to the head face 1 and $h_2$ is the length of the layer 5B from the magnetoresistive element 9 to its end away from the head face 1. The term $g_1$ is the distance between the second flux guide 7 and the layer portion 5AA of the magnetic layer 5A, which in this embodiment also defines the read gap. The above-mentioned expression is based on the $g_2$ is the distance between the second flux guide 7 and the layer portion 5AB. The above-mentioned expression is based on the assumption that $g_1/h_1$ is much larger than $g_2/h_2$.

The flux guides 5 and 7 may alternately be in mechanical contact with each other in an area remote from the head face, such as by a through connection in area 17.

The length h* of the common end portion 5E formed by the layers 5A and 5B is typically several microns.

It is to be noted that the invention is not limited to the above described embodiment. For example, the invention is eminently suitable for use in thin-film heads having various juxtaposed read portions.

I claim:

1. A thin-film magnetic head, comprising:
   (a) a substrate,
   (b) a magnetoresistive element,
   (c) a first magnetically conducting flux guide having a non-magnetic space bridged by the magnetoresistive element,
   (d) a second magnetically conducting flux guide extending substantially parallel to the first flux guide for magnetic cooperation with said element, and
   (e) a non-magnetic read gap adjacent to a head face extending between the flux guides, characterized in that the first flux guide is built up in layers and comprises a first soft-magnetic layer opposite the second flux guide, a second soft-magnetic layer and an insulation layer of a non-magnetic material extending substantially parallel to the substrate and being situated between said soft-magnetic layers, in that the soft magnetic layers are interconnected in a magnetically conducting manner proximate to the head face, in that the first soft-magnetic layer is an interrupted layer having two spatially separated layer portions separated by said space bridged by the magnetoresistive element and an insulating layer of a non-magnetic material separating said flux guides one from the other along their lengths.

2. A magnetic head as claimed in claim 1, characterized in that the soft magnetic layers are interconnected at an end portion terminating in the head face, the insulation layer between the soft magnetic layers being adjacent to said end portion.

3. A magnetic head as claimed in claim 1, characterized in that the magnetoresistive element extends between the second flux guide and the first soft-magnetic layer of the first flux guide.

4. A magnetic head as claimed in claim 1, characterized in that the insulation layer between the first and the second soft-magnetic layer has a thickness which is at least equal to $4h_2 \cdot g_1/h_1$, in which $h_1$ is the length, viewed from the head face, of the portion of the first magnetic layer adjacent to the head face, $h_2$ is the length, viewed from the head face, of the second soft-magnetic layer from the end of the magnetoresistive element furthest from the head face, and in which $g_1$ is the distance between the second flux guide and the layer portion of the first flux guide adjacent to the head face.

5. A magnetic head as claimed in claim 2, characterized in that the magnetoresistive element extends between the second flux guide and the first soft-magnetic layer of the first flux guide.

6. A magnetic head as claimed in claim 2, characterized in that the insulation layer between the first and the second soft-magnetic layer has a thickness which is at least equal to $4h_2 \cdot g_1/h_1$, in which $h_1$ is the length, viewed from the head face, of the portion of the first magnetic layer adjacent to the head face, $h_2$ is the length, viewed from the head face, of the second soft-magnetic layer from the end of the magnetoresistive element furthest from the head face, and in which $g_1$ is the distance between the second flux guide and the portion of the first flux guide adjacent to the head face.

7. A magnetic head as claimed in claim 3, characterized in that the insulation layer between the first and the second soft-magnetic layer has a thickness which is at least equal to $4h_2 \cdot g_1/h_1$, in which $h_1$ is the length, viewed from the head face, of the portion of the first magnetic layer adjacent to the head face, $h_2$ is the length, viewed from the head face, of the second soft-magnetic layer from the end of the magnetoresistive element furthest from the head face, and in which $g_1$ is the distance between the second flux guide and the layer portion of the first flux guide adjacent to the head face.

* * * * *